June 27, 1939. T. W. VICKERS 2,163,924
HYDRAULIC BRAKING SYSTEM
Filed Nov. 9, 1936
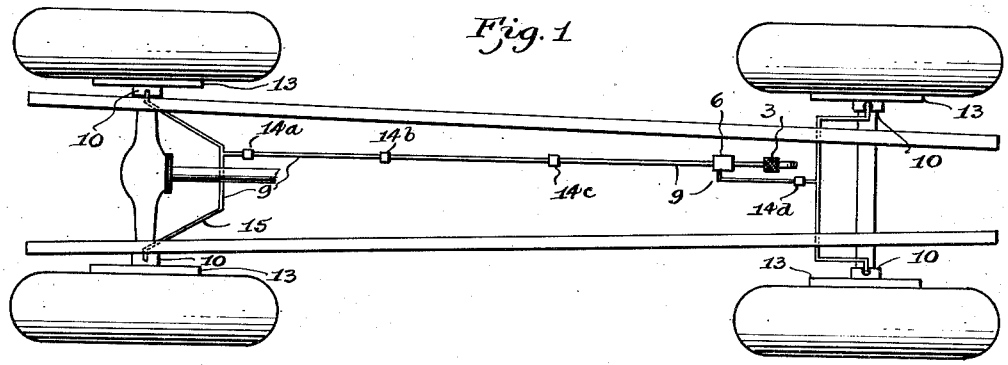
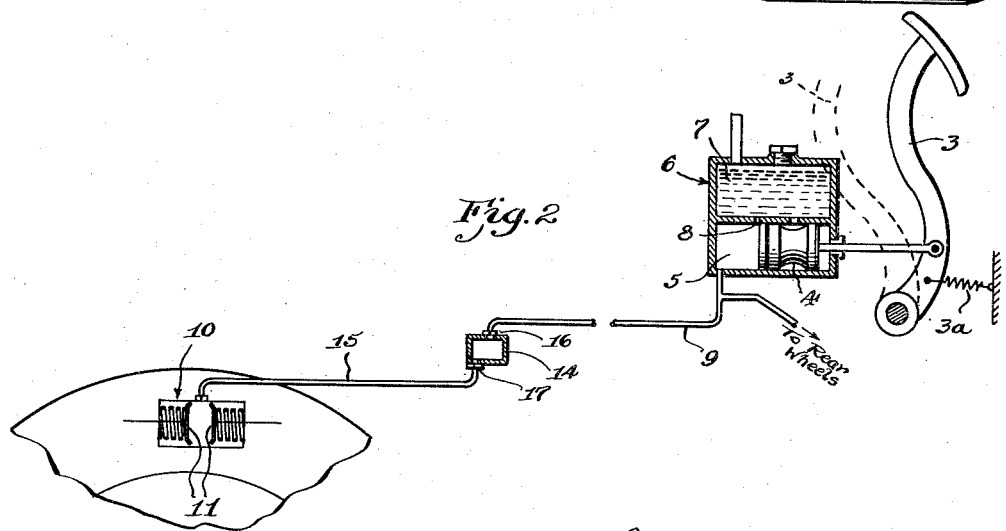
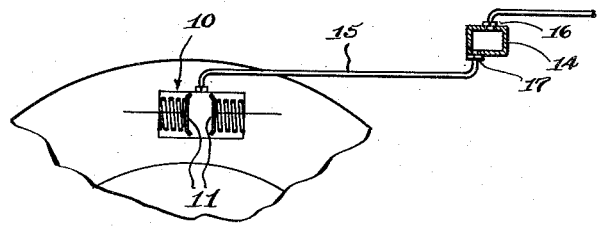
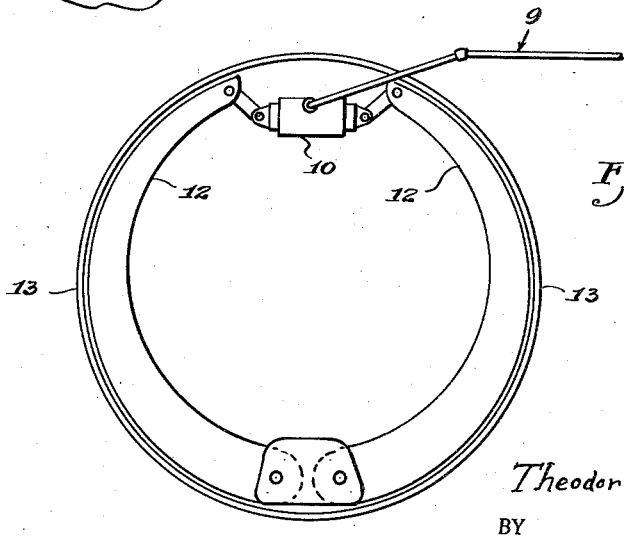
INVENTOR.
Theodore W. Vickers
BY
Barnes, Kisselle, Laughlin *Raisch*
ATTORNEYS Patented June 27, 1939

2,163,924

UNITED STATES PATENT OFFICE 2,163,924

HYDRAULIC BRAKING SYSTEM

Theodore W. Vickers, Los Angeles, Calif.

Application November 9, 1936, Serial No. 109,849

17 Claims. (Cl. 188—152)

This invention relates to improvements in a hydraulic braking system, in which vapor traps are spaced at intervals in the pressure line for the purpose of removing air and vapor from said lines.

In existing hydraulic braking systems, leakage of air past the brake pistons, or volatilizing of the fluid due to heat from the brake drums or atmosphere, will cause the formation of an air cushion in the line. This results in what is called a "soft" brake that requires considerable effort to manipulate successfully and is characterized by slower action. Ordinarily a correction of this condition requires the work of a mechanic to "wash out" the gas or air by pumping fluid through the lines, or the fitting of the system with a bleeder valve to be opened by a hand operation.

The object of the presnt invention is to furnish a hydraulic brake system which will include a means for automatically removing the air from the liquid lines, said means being designed to operate with the movement of the brake itself, and to require no attention from the driver or a mechanic. The installation of this apparatus will result in a braking system that will work at maximum efficiency at all times.

These objects are attained by mechanism illustrated in the accompanying drawing in which:

Fig. 1 is a plan view, largely diagrammatical, showing the relation of the present device to standard hydraulic braking system in a vehicle.

Fig. 2 is a more detailed cross sectional view of the hydraulic braking system showing the actuating lever and piston and the position of the vapor trap in the lines, and the design of the vapor trap.

Fig. 3 shows a view of the brake piston and shoes.

In Figs. 1 and 2 the foot lever 3 is operatively connected to a piston 4 which reciprocates in the master pressure forming cylinder 5 formed in the housing 6. A spring 3a serves to return lever 3 and piston 4 to the release position. Liquid is furnished to the cylinder 5 from a supply tank 7 through a vapor bypass opening 8. The pressure end of cylinder 5 is connected to lines 9 which run directly to secondary receiving brake or wheel cylinders 10 in which are located spring resisted pistons 11 operatively connected to brake shoes 12 which in turn are mounted to engage brake drums 13. Located in pressure lines 9 at predetermined intervals, as will be explained later, are air or vapor traps 14, a, b, c, d shown in Figs. 1 and 2. These traps 14 are preferably designed so that their total liquid capacity is slightly greater than the liquid capacity of either the wheel cylinders or the sections of line 9 connecting the said traps in the line. They operate to permit air or gas to separate from the liquid and, by reason of the liquid pressure, to rise to the top of the enlargement or trap. It is important to note here that as shown in Fig. 2, the two openings 16—17 in the trap 14 should be placed at the top and at or near the bottom respectively, the opening nearer the pressure forming piston 4 being placed at the top of the trap. Hereinafter, in referring to the trap connections nearest the master cylinder, I shall mean, the connection hydraulically nearest the master cylinder and not necessarily physically nearest it.

Normally, air or vapor which is trapped in a liquid will rise to the top of the liquid and escape into the atmosphere above it, but if the liquid is in a vessel of sufficiently small diameter air cannot rise through the liquid due to piston action of the liquid above, and to the surface tension of the liquid. The diameter of the tubing that is required on hydraulic brake lines is sufficiently small that air cannot of itself rise through a liquid filled line to the top portion of the line. Also parts of the line are, of necessity, horizontal so that air could not, under any circumstances, rise by the force of the liquid. It is necessary, therefore, to devise some means of removing this air from the liquid line. By introducing enlargements in these lines at spaced intervals, in a manner shown in Fig. 2 at 14 any air that reaches the enlargement will be separated from the liquid due to liquid pressure and will collect at the top of the enlargement 14. There it will remain when the line is subjected to liquid flow from the top inlet 16 through the lower outlet 17. But it will readily be seen that if that flow is reversed to come from the lower opening 17 to and through the upper opening 16 the air will be carried by the liquid from the top of the trap up into the lines; and if the air reaches another similar enlargement in the line before the liquid flow is stopped it will remain there during a reversal of the flow and until the direction of the flow is again from the lower trap opening through the upper trap opening.

Assume, for example, that there is some air or vapor in the pressure line 9 at 15 shown in Fig. 1. When the foot lever 3 is depressed, liquid will be forced by the piston 4 from the cylinder 5 through the line 9 to the cylinder 10 and pistons 11, the latter being forced outward to press the brake shoes 12 against the brake drum 13. The air in section 15 of line 9 will be compressed in the line but will remain there. When the foot lever 3 is released liquid will surge back to cylinder 5 due to the action of the piston 4 and pistons 11. Said pistons being returned to normal position by return springs. This surging will carry the air in section 15 of line 9 to the air trap 14a where the air will be forced by liquid pressure to the top of said trap. When next the foot lever 3 is depressed the flow will be downward through the trapped air, pressure being exerted against it. A raising of the foot lever 3 will again move this trapped air to the next adjacent vapor trap 14b where it will again rise to the top until further flow cycles carry it to vapor trap 14c and thence to the cylinder 5 where it will pass to the atmosphere through the vapor release bypass opening 8, and supply tank 7.

It is evident that the design of the system will require a spacing of the vapor traps 14 in such manner that the liquid capacity of the tubing between each trap, or between each trap and cylinder, will be slightly less than the total displacement volume of each wheel cylinder. This will insure that each surge of the pressure piston will move the liquid in the line a distance at least equal to that between the traps, and carry any air or vapor from trap to trap towards the master cylinder and bypass opening. In actual practice with the use of standard $\frac{3}{16}$ OD tubing of wall .035", wheel cylinder 10 of 1¼" diameter, and piston displacement of $\frac{3}{16}$", a spacing of vapor traps at 18" is successful. It is clear that if a single pressure line is used for two wheel cylinders, as shown in Figure 1, the combined piston displacement would be greater, and a greater distance between the traps could be used. It will also be seen that if the pressure line were of sufficiently small diameter, a single trap could be used in the line.

As previously mentioned the preferred design of the vapor traps 14 requires that they have a liquid capacity at least equal to, and, at best, a little greater than, the liquid capacity of the wheel cylinders or the sections of line 9 connecting said traps. The result of this design will be that any movement of the liquid in the lines will not carry any vapor past these vapor traps but only into the traps, so that it may rise to the top while the braking system is at rest, and be carried to the next trap at the next back stroke of the pressure piston 4. It will be seen that if the vapor trap were much smaller than the above mentioned dimensions the air might be carried back and forth through them and not be permitted to separate to the top of the trap.

Thus an air and vapor removing system is provided which will effectively and continually remove the air and vapor from the liquid lines without an expensive and time consuming operation. Furthermore, the device has the advantage of being simple, inexpensive and of such design that it will not wear or get out of order.

What I claim is:

1. In a hydraulic brake system, a master liquid pressure forming cylinder unit provided with a vapor release bypass, a spring resisted movable piston for building up liquid pressure in said master cylinder upon the compression stroke of the piston, braking mechanism, secondary receiving cylinder units, spring resisted pressure responsive pistons in said secondary cylinders for actuating a braking mechanism, hydraulic connecting lines, and one or more vapor trap units connected between said lines consisting of enlargements in said lines, said enlargements having liquid capacity at least equal to the liquid capacity of the secondary receiving cylinders, the line connections in said vapor trap units being located substantially at the top, and substantially at the bottom respectively, the top connections being nearest the master cylinder, said units being spaced from each other at intervals substantially equal to or less than the distance which the liquid moves during a stroke of the pressure forming piston.

2. In a hydraulic brake system, a master liquid pressure forming cylinder unit provided with a vapor release bypass, a movable piston for building up liquid pressure in said master cylinder upon the compression stroke of the piston, braking mechanism, secondary receiving cylinder units, one or more pressure responsive pistons in said secondary cylinders for actuating a braking mechanism, a hydraulic connecting line, and vapor trap units connected in said line consisting of enlargements in said line, said enlargements having liquid capacity slightly greater than the liquid capacity of the secondary receiving cylinders, the line connections in said vapor traps being located substantially at the top, and substantially at the bottom respectively, the top connections being nearest the master cylinders, said units being spaced from each other, at intervals such that the liquid capacity of each connecting section of the line is substantially equal to or less than the liquid capacity of the secondary receiving cylinders to which the line leads.

3. In a hydraulic brake system, a master liquid pressure forming cylinder unit provided with a vapor release bypass, a movable piston for building up liquid pressure in said master cylinder upon the compression stroke of the piston, braking mechanism, secondary receiving cylinder units, pressure responsive pistons in said secondary cylinders for actuating a braking mechanism, a hydraulic connecting line, and vapor trap units connected in said line consisting of enlargements in said line, said enlargements having liquid capacity at least equal to the liquid capacity of the secondary receiving cylinder, the line connections in said vapor trap units being located substantially at the top, and substantially at the bottom respectively, the top connections being nearest the master cylinder, said units being spaced from each other at intervals substantially equal to or less than the distance which the liquid moves during a stroke of the pressure forming piston, said vapor trap units cooperating with the movement of the liquid in the line to permit egress of vapor from the line to the vapor release bypass.

4. In a hydraulic brake system, a master liquid pressure forming cylinder unit provided with a vapor release bypass, a movable piston for building up liquid pressure in said master cylinder upon the compression stroke of the piston, braking mechanism, secondary receiving cylinder units, pressure responsive pistons in said secondary cylinders for actuating a braking mechanism, a hydraulic connecting line, and vapor trap units connected in said line consisting of enlargements in said line, said enlargements having liquid capacity slightly greater than the liquid capacity of the secondary receiving cylinder, the line connections in said vapor traps being located substantially at the top, and substantially at the bottom respectively, the top connections being nearest the master cylinder, said units being spaced from each other, at intervals such that the liquid capacity of each connecting section of the line is substantially equal to or less than the liquid capacity of the secondary receiving cylinders, said vapor trap units cooperating with the movement of the liquid in the line to permit egress of vapor from the line to the vapor release bypass.

5. In a hydraulic brake system of the plunger piston type having pressure responsive means for actuating a braking mechanism, liquid carrying pressure lines, pressure forming means provided with a vapor release bypass, and vapor traps connected between said lines consisting of enlargements in the lines, said enlargements having liquid capacity substantially equal to the liquid capacity of the pressure responsive means, the line connections in said vapor traps being located at the top and substantially at the bottom, respectively, of the vapor traps, the top connections being nearest the master cylinder, said vapor traps being spaced, from each other, and from the pressure forming and pressure responsive means, at intervals such that the liquid capacity of each connecting line is equal to slightly less than the capacity of the pressure responsive means, said vapor trap means cooperating with the liquid to permit egress of vapor from the lines to the vapor release bypass.

6. In a hydraulic brake system of the plunger piston type having pressure responsive means for actuating a braking mechanism, liquid carrying pressure lines, pressure forming means provided with a vapor release bypass, and spaced vapor traps connected between said lines consisting of enlargements in the line, said enlargements having liquid capacity greater than the liquid capacity of the pressure responsive means, the line connections in said vapor traps being respectively located substantially at the top and substantially at the bottom, of the vapor traps, the top connection being nearest the master cylinder.

7. In a hydraulic brake system, a master pressure forming piston and cylinder, secondary receiving cylinders, spring resisted pressure responsive pistons slidable in said receiving cylinders, hydraulic lines connecting said cylinders, one or more spaced vapor traps in the line between the pressure forming and receiving cylinders, said traps comprising enlargements having liquid capacity substantially equal to that of the secondary receiving cylinders, the line connections in said vapor traps being located substantially at the top and substantially at the bottom respectively, the connection nearer the master cylinder being the top connection, and said one or more vapor traps being spaced, from each other, and/or from the master and secondary cylinders, at intervals equal to slightly less than the distance which the liquid moves in the line during a stroke of the pressure piston, and means in said master piston for causing the withdrawal of collected vapor therefrom.

8. In a hydraulic brake system, the combination of a master piston and cylinder provided with a vapor release bypass, secondary receiving cylinders, spring resisted pistons located therein, a hydraulic line connecting the master and receiving cylinders, and spaced vapor traps in the line, said traps comprising enlargements having liquid capacity slightly greater than the secondary receiving cylinders, the line connections in said vapor traps being located substantially at the top and substantially at the bottom respectively, the connection nearer the master cylinder being the top connection, and said vapor traps being spaced, from each other, and from the master and secondary cylinders, at intervals such that the liquid capacity of each connecting section of the line is substantially equal to or less than the liquid capacity of the secondary receiving cylinders.

9. In a hydraulic brake system of the plunger piston type, a master pressure forming cylinder unit, one or more secondary receiving cylinder units containing brake actuating pressure responsive pistons, hydraulic connecting lines between said cylinder units, one or more vapor trap units in the lines spaced therein at predetermined intervals from each other and/or from the master and secondary cylinders and having upper and lower line connections, the upper connections being nearest the master cylinders, the number of vapor traps in said lines being such that the liquid capacity of any of said intervals in the hydraulic lines is not greater than the liquid capacity of the one or more secondary cylinders to which the line leads, and means for causing the removal of collected vapor from said master cylinder.

10. In a hydraulic brake system of the plunger piston type, a master pressure forming cylinder unit provided with a vapor release bypass, one or more secondary receiving cylinder units containing brake actuating pressure responsive pistons, hydraulic lines connecting said cylinder units, and one or more vapor trap units consisting of enlargements in the lines having liquid capacity substantially equal to that of the secondary receiving cylinders to which said lines lead and spaced in said lines at predetermined intervals from each other and/or from the master and secondary cylinders, the number of vapor traps being such that the liquid capacity of any one of said intervals in the hydraulic lines is not greater than that of said secondary cylinders, said trap units having upper and lower line connections, the upper connection being nearest the master cylinder.

11. In a hydraulic brake system, a master pressure forming piston and cylinder, one or more secondary receiving cylinders, one or more spring resisted pressure responsive pistons slidably mounted therein, hydraulic lines connecting said cylinders, spaced vapor traps in said lines having upper and lower line connections, the upper connections being nearest the master cylinder, the total capacity of each of the vapor traps being substantially equal to the capacity of the secondary receiving cylinders, and not less than the capacity of each hydraulic line between said vapor traps, or between said master and secondary cylinders and said vapor trap or traps, and means for causing removal of collected vapor from said master cylinder.

12. In a hydraulic brake system having pressure and release cycles, a master liquid pressure forming cylinder unit provided with a vapor release bypass, a spring resisted movable piston for building up liquid pressure in said master cylinder upon the compression stroke of the piston, braking mechanism, secondary receiving cylinder units, spring resisted pressure responsive pistons in said secondary cylinders for actuating a braking mechanism, hydraulic connecting lines, and one or more vapor trap units connected between said lines, said trap units having liquid capacity at least equal to the liquid capacity of the secondary receiving cylinders, the line connections in said one or more vapor trap units being located substantially at the top, and substantially at the bottom respectively, the top connection being nearest the master cylinder unit, said units being spaced from each other at intervals substantially equal to or less than the distance which the liquid moves during a stroke of the pressure forming piston, said vapor traps serving to trap air and vapor during the pressure cycle, said trapped air and vapor being carried to the next adjacent vapor trap by the back movement of the liquid during the release cycle, and/or finally carried to the bypass vapor release by subsequent pressure and release cycles.

13. In a hydraulic brake system having pressure and release cycles, a master liquid pressure forming cylinder unit provided with a vapor release bypass, a spring resisted movable piston for building up liquid pressure in said master cylinder upon the compression stroke of the piston, braking mechanism, secondary receiving cylinder units, spring resisted pressure responsive pistons in said secondary cylinders for actuating a braking mechanism, hydraulic connecting lines, and vapor trap units connected between said lines, said trap units having liquid capacity slightly greater than the liquid capacity of the secondary receiving cylinders, the line connections in said vapor traps being located substantially at the top, and substantially at the bottom respectively, said top connections being located nearest the master cylinder, said units being spaced from each other, at intervals such that the liquid capacity of each connecting section of the line is substantially equal to or less than the liquid capacity of the secondary receiving cylinder, said vapor traps serving to trap air and vapor during the pressure cycle, said trapped air and vapor being carried to the next adjacent vapor trap by the back movement of the liquid during the release cycle, and finally carried to the bypass vapor release by subsequent pressure and release cycles.

14. In a hydraulic brake system, a master liquid pressure forming cylinder unit provided with a vapor release bypass, a spring resisted movable piston for building up liquid pressure in said master cylinder upon the compression stroke of the piston, braking mechanism, secondary receiving cylinder units, spring resisted pressure responsive pistons in said secondary cylinders for actuating a braking mechanism, hydraulic connecting lines, and vapor trap units connected between said lines, said trap units having liquid capacity slightly greater than the liquid capacity of the secondary receiving cylinders, the line connections in said vapor traps being located substantially at the top, and substantially at the bottom respectively, the top connection being nearest the master cylinder, said units being spaced from each other, at intervals such that the liquid capacity of each connecting section of the line is substantially equal to or less than the liquid capacity of the secondary receiving cylinder, said vapor trap means cooperating with the movement of the liquid in the lines to permit egress of vapor from the lines to the vapor release bypass, said vapor traps serving to trap air and vapor during the pressure cycle, said trapped air and vapor being carried to the next adjacent vapor trap by the back movement of the liquid during the release cycle, and finally carried to the bypass vapor release by subsequent pressure and release cycles.

15. In a hydraulic brake system of the plunger piston type, a master pressure forming cylinder unit, one or more secondary receiving cylinder units containing brake actuating pressure responsive pistons, hydraulic connecting lines between said units, one or more vapor trap units consisting of enlargements in the lines having connections at the top and bottom portions respectively, the top connection being nearest the master cylinder, said units being so spaced in the hydraulic connecting lines that the liquid capacity of any one section of the line between any two adjacent units is not greater than the liquid capacity of the one or more secondary cylinders to which the lines lead, and means for causing the removal of collected vapor from said master cylinder.

16. In a hydraulic brake system of the plunger piston type, pressure responsive means for actuating a braking mechanism, liquid carrying pressure lines, pressure forming means provided with a vapor release bypass, and one or more spaced vapor trap means connected between said lines, the line connections in said trap being, respectively, at the lower and upper portions of said trap, the upper connections being nearest the master cylinder, all of said means being spaced from each other at intervals such that the movement of liquid in pressure lines between said means will carry vapor bubbles toward said vapor bypass.

17. In a hydraulic brake system of the plunger piston type, a master pressure forming cylinder unit, one or more secondary receiving cylinder units containing brake actuating pressure responsive pistons, a hydraulic connecting line between said cylinder units, vapor trap units in the line spaced therein at predetermined intervals from each other such that movement of liquid in the line connecting said units will carry vapor bubbles toward said master cylinder, said trap units having connections with said line substantially at the top and bottom portions of said traps, the top connections being nearest the master cylinder, and means in said master cylinder for causing the withdrawal of collected vapor therefrom.

THEODORE W. VICKERS.